No. 638,472. Patented Dec. 5, 1899.
C. J. REED.
SECONDARY BATTERY OR ACCUMULATOR.
(Application filed Dec. 31, 1895.)
(No Model.)

WITNESSES:
C. E. Ashley
M. M. Robinson

INVENTOR:
Charles J. Reed
By his Attorney
Charles J. Kintner

UNITED STATES PATENT OFFICE.

CHARLES J. REED, OF PHILADELPHIA, PENNSYLVANIA, ASSIGNOR TO THE SECURITY INVESTMENT COMPANY, OF PENNSYLVANIA.

SECONDARY BATTERY OR ACCUMULATOR.

SPECIFICATION forming part of Letters Patent No. 638,472, dated December 5, 1899.

Application filed December 31, 1895. Serial No. 573,975. (No model.)

*To all whom it may concern:*

Be it known that I, CHARLES J. REED, a citizen of the United States, residing at Philadelphia, county of Philadelphia, and State of Pennsylvania, have made a new and useful Invention in Secondary Batteries or Accumulators, of which the following is a specification.

My invention relates particularly to improvements in that type of secondary batteries or accumulators in which the active material of the negative plate or electrode is a metal electrolytically deposited upon the plate during the act of charging the accumulator. As an illustration of the type of battery referred to I may mention the well-known copper-zinc alkaline battery of Desmazures or the lead-zinc battery of Reynier.

In the type of battery referred to, metallic zinc or some other highly electropositive metal is deposited in a metallic state upon a support of copper, lead, or iron during the act of charging the battery. This deposit usually partakes of a crystalline or irregular form, and these crystals of zinc or equivalent metal frequently become loosened or detached and drop from the plate or electrode to the bottom of the cell. An accumulation of such detached particles or crystals at the bottom of the cell necessarily produces short circuits, thereby materially deteriorating the battery.

The object of the present invention is to prevent this accumulation of zinc or equivalent crystals in the bottom of storage battery or accumulator cells, and consequently the deleterious results therefrom. I accomplish this object in a very efficient manner by placing in the bottom of the containing vessel a plate or plates of carbon or platinum or equivalent electronegative material which is not acted upon by the battery solution. When the particles or crystals of zinc or equivalent metal fall on this plate, they are rapidly dissolved by the battery solution owing to the galvanic action of the local circuit produced by the contact of two dissimilar conductors in contact with said solution.

My invention will be fully understood by referring to the accompanying drawings, in which—

Figure 1:
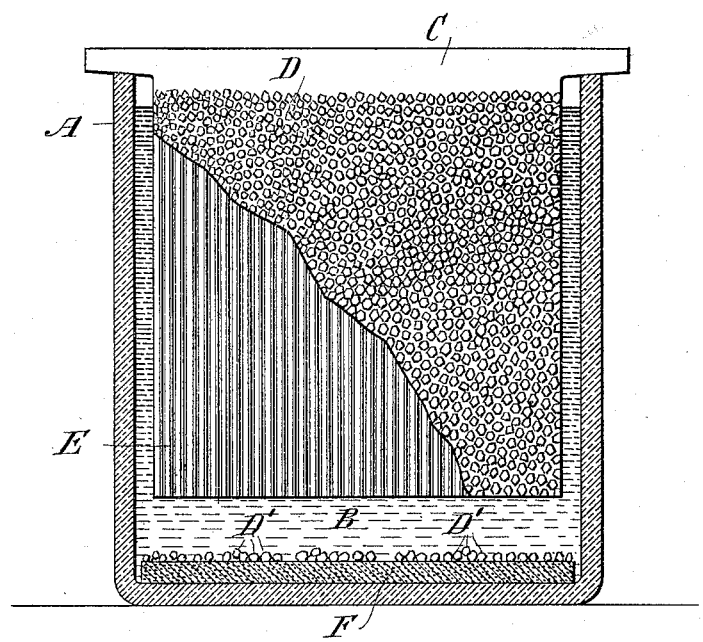
Figure 2:
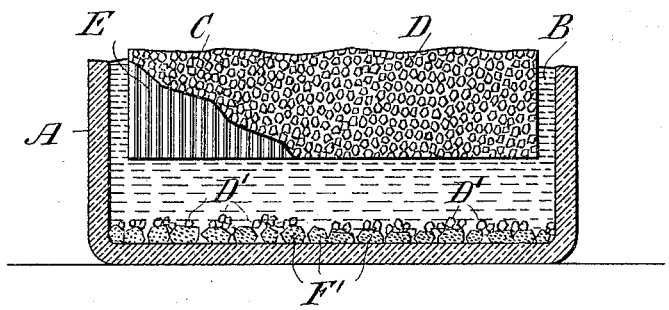

Figure 1 is a vertical sectional view taken through a battery-cell, illustrating the electrodes in vertical elevation and the means of preventing the action referred to in the bottom of the cell, one of the electrodes being partly broken away, so as to show the rear electrode. Fig. 2 is a similar sectional view of the bottom portion of a similar cell and the electrodes, illustrating also a modified means for attaining the results sought.

Referring to the drawings in detail, A represents a battery-cell, of glass, hard rubber, or the like, and E a corrugated positive electrode, of lead or equivalent material, C being a simple sheet negative electrode, of copper, lead, iron, or equivalent metal, and B a battery solution of zinc sulfate, or such as is used in the type of batteries above referred to.

D represents the zinc crystals deposited upon the negative electrode C during the act of charging the battery. F represents a sheet or plate of carbon, platinum, or equivalent electronegative metal which is not acted upon by the battery solution, and D' D' represent the detached metallic particles or crystals which have become separated from the negative plate C and accumulated upon the top surface of the sheet or plate F. As hereinbefore indicated, when these crystals fall upon the upper surface of the sheet or plate F local action is set up and they are dissolved, the zinc entering again into the battery solution.

In the place of a sheet or sheets F of carbon, platinum, or electronegative metal I may employ broken fragments of carbon or any such metal, as indicated at F' in Fig. 2 of the drawings.

I do not limit myself to any particular arrangement of a metal or material which will accomplish the effect herein sought, as I believe I am broadly entitled to a method of obviating the deleterious effects by dissolving the crystals which accumulate at the bottom of a cell as hereinbefore described, and my claims therefore are to be construed as covering generically the accomplishment of such result. Nor am I limited to any particular substance when disposed in the manner referred to, although I prefer to use a sheet or fragments of platinum or carbon, or these substances may be rendered still more efficient by covering them with a deposit of platinum—black or spongy platinum. I may connect the sheet or conductor F or F' with the positive plate of the battery, in which event the effect will be much more rapid; but I prefer not to do this owing to the fact that it utilizes some of the battery charge of the positive plate in effecting the result sought.

Having thus described my invention, what I claim, and desire to secure by Letters Patent of the United States, is—

1. The method of preventing deleterious effects in a secondary battery in which active material is deposited upon one electrode or set of electrodes from the battery solution during the charging operation, which consists in subjecting detached particles of active material to localized electrolytic action whereby they are redissolved into the battery solution.

2. The method of preventing deleterious effects in a secondary battery in which active material is deposited upon one electrode or set of electrodes from the battery solution during the charging operation, which consists in effecting mechanical contact between detached particles of active material and an isolated mass of electronegative material in the battery solution, whereby said detached active material becomes reincorporated into the battery solution.

3. A secondary battery having a solution or electrolyte, electrodes upon which active material is deposited from the solution during the charging operation, and an isolated mass of electronegative material so located as to be engaged by detached particles of active material and effect a reincorporation of the same into the battery solution.

4. In a secondary battery or accumulator, a disconnected or neutral mass of electronegative conducting material located at or near the bottom of the cell and adapted to receive detached particles of active material which may fall thereon, whereby said particles become dissolved by local electrolytic action, substantially as described.

5. In a secondary battery or accumulator, an electrode on which zinc is deposited, in combination with a suitable electrolyte and a mass of electronegative conducting material located at or near the bottom of the cell for causing detached particles of zinc to be redissolved in the electrolyte, substantially as described.

In testimony whereof I have hereunto subscribed my name this 5th day of December, 1895.

CHARLES J. REED.

Witnesses:
PARKER ROSS FREEMAN,
MATTHEW RANDALL.